United States Patent [19]
Miller et al.

[11] Patent Number: 5,356,643
[45] Date of Patent: Oct. 18, 1994

[54] CHEESE-BASED DRY FLAKE PRODUCTS AND SNACK ITEMS AND PROCESSES FOR PRODUCING THE SAME

[76] Inventors: Van Miller, R.R. #2, Brisbane Erin, Ontario, Canada, N0B 1T0; Rene Miller, 9 Carey Crescent, Guelph, Ontario, Canada, N1H 7J9

[21] Appl. No.: 216,452

[22] Filed: Mar. 23, 1994

Related U.S. Application Data

[63] Continuation-in-part of Ser. No. 26,738, Mar. 5, 1993, and a continuation-in-part of Ser. No. 77,103, Jun. 16, 1993, and a continuation-in-part of Ser. No. 77,104, Jun. 16, 1993.

[51] Int. Cl.$^5$ ............ A23C 19/00; A21D 13/00
[52] U.S. Cl. ............................... 426/94; 426/140; 426/582; 426/653
[58] Field of Search ............ 426/92, 93, 94, 582, 426/653, 613, 89, 138, 140

[56] References Cited

U.S. PATENT DOCUMENTS

| | | | |
|---|---|---|---|
| 2,015,257 | 5/1934 | Clickner | 426/582 |
| 4,198,439 | 4/1980 | Hoover | 426/632 |
| 4,251,551 | 2/1981 | Van Hulle et al. | 426/94 |
| 4,567,047 | 1/1986 | Wilson | 426/94 |
| 4,643,907 | 2/1987 | Player et al. | 426/582 |

FOREIGN PATENT DOCUMENTS 0121253 10/1984 European Pat. Off.

OTHER PUBLICATIONS

Webster's Third New International Dictionary, G&C Merrian Co., Springfield Mass., 1961, p. 786.

*Primary Examiner*—Donald E. Czaja
*Assistant Examiner*—Curtis E. Sherrer
*Attorney, Agent, or Firm*—Donald E. Hewson

[57] ABSTRACT

An anhydrous cheese-based product is provided which may be made into a cheese-based dry flake for incorporation into baked goods and flour confections, or which may be used in the preparation of snack items. The cheese-based product comprises from substantially 0 to 2% by weight of moisture, from about 20% to about 50% by weight of cheese solids, with the balance being cheese-compatible oils. The cheese solids are naturally occurring cheese solids that are derived from cheeses from which substantially all water has been removed, and thereby comprise the butterfat, protein, and lactose constituents of cheese. The cheese-compatible and bakery-compatible oils must be selected from the group consisting of suitable vegetable oils, butter oils, or other dairy fats, and mixtures thereof, which exhibit generally similar solid fat index and melting point characteristics as those of butterfat; and they must be miscible with the butterfat constituent of cheese solids, in any proportion, at temperatures of about 35° C. to about 40° C., so as to make a substantially homogenous mixture therewith, and in which the protein and lactose constituents are held in suspension. In manufacture, the ingredients are mixed so that the solids are suspended in the oils, and oil crystallization is initiated in a tempering unit. Then, the tempered product is passed through a cooling tunnel to cool and crystallize the fats.

46 Claims, 5 Drawing Sheets

CHEESE-BASED DRY FLAKE PRODUCTS AND SNACK ITEMS AND PROCESSES FOR PRODUCING THE SAME

RELATED APPLICATIONS

This application is a continuation-in-part application of application Ser. No. 08/026,738 filed Mar. 5, 1993 and application Ser. No. 08/077,103 filed Jun. 16, 1993 and application Ser. No. 08/077,104 filed Jun. 16, 1993.

FIELD OF THE INVENTION

This invention relates to cheese-based dry flake products intended for incorporation into baked goods and other flour confections. Specifically, cheese-based dry flakes or small discrete pieces or particles of prepared cheese-based product which may be used for baking purposes are provided that may be incorporated into baked goods and other flour confections, where the flavor of cheese is retained in such a manner that it may be discerned when the baked product is consumed. The dry flake product, the process for making the product, and apparatus on which the product may be prepared, are described.

Moreover, the present invention provides snack items, specifically molded snack items that have a distinctive and discrete cheese-based component, molded cheese-based snack bars having a cereal or other cheese-compatible edible additive, or a molded cheese-based layer in combination with biscuits or crackers, all of which have extended shelf-life, and which may be easily consumed simply by removing individual snack items from their wrapping or package. The cheese-based component of such snack items is based on the same general cheese solids and fat systems as the cheese-based dry flake products.

BACKGROUND OF THE INVENTION

It has been traditional for many years for the bakery industry, and the baked confection industry, to bring to the consuming product baked goods and flour confections where cheese is a principal flavor ingredient. Such products may include buns and muffins, biscuits, other breads and loaves, sweet confections having a cheese additive, and so on. However, the preparation of baked products including cheese, or even pizza, will essentially destroy the flavor and/or texture of the cheese due to the heat at which the product is baked.

In the preparation of such products as cheese bread, it has been traditional to use cheese flakes or grated cheese taken directly from block cheese by shaving or grating the cheese block. The cheese flakes or grated cheese powder are added to the mixture to be baked—usually just prior to the baking process. Even so, however, the baked product, or at least the cheese in the baked product, may become essentially flavorless, or the cheese may acquire a gummy texture, or the lactose contained in the cheese may have become burned or caramelized, leaving a burnt and otherwise unpleasant taste sensation. Indeed, it does not go unnoticed that mozzarella cheese, the cheese most commonly used in the preparation of pizza, may become less flavorful than it was previously and/or become gummy in its texture.

In the preparation of baked product such as cheese bread, where grated cheese has been made using bulk cheese product, the baking process causes the water constituent of the cheese to evaporate. Then, the protein constituent of the cheese, which remains, acts like a gum, and also the lactose constituent of the cheese will begin to caramelize. That is why the traditional use of grated cheese or cheese flakes prepared by grating, shaving or flaking brick cheese or bulk cheese, results in less than satisfactory baked product.

The general and approved definition of cheese, and the standards by which cheese is defined, require that cheese when it is in its brick or bulk form contains approximately 50% to 52% of moisture, with 23% to 25% butter fat, 9% to 10% protein constituents, and the balance or remainder being lactose. Cheese may, itself, be dried so as to substantially drive off most of the moisture constituent of the block or bulk cheese, while retaining the remainder of the cheese constituents as cheese solids.

If those cheese solids can be obtained and preserved, as is possible merely by driving off substantially all of the water or moisture content of the cheese, then most of the flavor sensations of the cheese would remain. However, the cheese solids or powder that would then remain cannot themselves be incorporated into baked goods.

The present inventors have quite unexpectedly discovered, however, that if cheese solids which are obtained by driving off the moisture content of brick or bulk cheese are then suspended in compatible oils or liquid fats, and then otherwise treated as described in greater detail hereafter, then a cheese-based product results which can be baked into baked goods or other flour confections. The flavor sensations and constituency of the cheese in the baked product are quite satisfactory.

It is recognized that the preparation of baked cheese products or other flour confections cannot simply be achieved by preparing flakes, chips or grated cheese from bulk or brick cheese and incorporating them into the bakery mix in much the same way as, for example, chocolate chips are incorporated into baked products. This is because, as noted above, the water or moisture content of the cheese evaporates during baking and the evaporation takes with it a certain portion of the flavor sensations that may otherwise have been present. Also, as noted, the remaining protein acts like a gum, and the lactose may caramelize.

The present invention provides a cheese-based dry flake product which does not exhibit the shortcomings of the prior art, and the common bakery experiences described above. By providing a cheese-based dry flake product the present invention will provide what may be described as a cheese product for incorporation into baked products and other flour confections, where the nature of the cheese-based product may be such that its characteristics such as its viscosity and its ingredient contents may be determined and adjusted or tailored for specific intended uses. In other words, the present invention will provide a cheese ingredient for incorporation into such varying products as tea biscuits which may have a relatively fast baking time—for example, 10 or 15 minutes—at baking temperatures of about 177° C. (350° F.) while also providing other cheese-based flavoring ingredients to be baked into cheese breads which may be baked for 30 or 40 minutes at temperatures above 177° C.

In order to do so, then the process for preparation of the cheese-based dry flake product of the present invention must be such that it can be controlled for consistency of results, and controlled for differences between cheese-based dry flake products being manufactured at different times, as necessary.

In order for that to happen, certain criteria are required. Specifically, it is necessary that the formulation for preparation of the cheese-based dry flake product must incorporate the use of compatible oils that are compatible both with the cheese solids being used and with the bakery or other flour confection to be manufactured.

As will be described hereafter, suitable cheese-compatible and bakery-compatible oils will generally be liquid butter fats—derived from milk fat—or vegetable oils that display similar solid fat index and melting points as those of butter fat. Other characteristics, generally stated, are that oils to be used in the formulation of cheese-based dry flake products according to the present invention should be such that when they are solidified they will smear or become part of the shortening being mixed into the bakery mix prior to the baking process; the oils should be such that when they are solidified they will stay relatively firm during the baking process and yet have a mouth sense in that they will essentially melt in the mouth at approximately 35° C.; and of course, the oils or fats must be such that they will not otherwise conflict with or be intolerable with the intended baked goods in which they will be present.

A corollary to the above is that, as is now being required more and more frequently and more rigidly, the oils or fats and other ingredients used to prepare cheese-based dry flake products in keeping with the present invention must be compatible with the requirements for controlled ingredient legends and other labelling provisions that are imposed on food products.

Another aspect of the present invention is the provision of cheese-based snack items. The desire to have a snack—a small portion of food that is usually tasty and usually unlike that which is consumed at the table—is universal. Many people, ranging from pre-school children to elderly retirees are driven to seek something to eat other than at regularly scheduled meal times. Teenagers are notorious for snacking between classes, in class, when they return home from school, after dinner while watching television or doing homework, and so on. Office workers will snack at their desks, perhaps with a cup of coffee or glass of juice consumed at their desk during working hours; and many factories, whether they are unionized or not, have or will permit short breaks during work shifts for their employees to stop, refresh themselves, and partake of a snack.

However, people are becoming more health conscious, and desirous of either cutting down on their intake of "junk foods" as well as their intake of excessive amounts of calories, cholesterol, and so on. This has led to specific attempts on the part of families, teachers, dietary experts, and the like, to teach and encourage consumption of "healthful" foods, and to avoid excessive consumption of overly sweet, sugar-laden products. Unfortunately, some snack items that are particularly advocated are such as fruits, which are perishable, and which must be carefully stored and wrapped because of their likelihood of rotting or becoming mouldy. Even the consumption of cookies, especially those which have sugar-based fillings or coatings, or fruit jam or jelly fillings, is being discouraged by dietary experts. Moreover, fillings and coatings that are based on sugar and/or chocolate may tend to degrade in time, or become mouldy. Other snack items may include slices from cheese bricks or wheels, which may be consumed with crackers or the like.

Indeed, many people will prepare snack items by spreading crackers, which have low calorie content and are otherwise quite healthful, with cheese; or they may bring small containers of a cheese and some crackers to their school or work place, for purposes of having a snack. However, spreading a cracker or thin biscuit with cheese very often results in the cracker or biscuit fracturing, and it generally requires the use of highly processed cheeses which are spreadable and which contain more moisture than natural cheeses such as brick, Cheddar or Gruyere cheeses.

Thus, the present invention provides a convenient snack item which has exceptional shelf-life and which has all of the health advantages of natural and high grade cheeses, together with natural cereals or other cheese-compatible edible additives—especially those which do not have a high sugar or fat content. Thus, the present invention provides a molded cheese-based snack bar which has a particulate cheese-compatible and edible additive admixed to a molded cheese-based product. The snack bar is primarily cheese, but will have a flavor and mouth sensation whose contribution comes from the nature of the particulate cheese-compatible and edible additive that is admixed to it. For example, a typical particulate cheese-compatible edible additive may be crisp puffed rice or crisp puffed wheat. Other prepared breakfast cereals—although, in general, not the pre-sweetened or sugar coated cereals—may also be utilized; however, crisp puffed rice or crisp puffed wheat are the most likely candidates from the point of view of the taste sensation when combined with that of cheese, and that might be demanded by or acceptable to the snack consuming public. Moreover, other particulate cheese-compatible edible additives that may be used for preparation of the molded snack bar of the present invention include such items as popcorn—usually fresh but dried popcorn without salt or butter having been added thereto—as well as peanuts, croutons, bacon bits, and the like.

PRIOR ART

One prior art approach is that of FEHR et al U.S. Pat. No. 3,582,353 issued Jun. 1, 1971. There, a flavored and/or colored shortening material of hard fat having a sharp melting point is used and distributed into the bakery mix. What results is distributed localized areas throughout the baked product, when it has been baked, that have a particular mouth sensation similar to butter. The flavoring materials may include spices, simulated meat, fruit, fowl or vegetable flavors, or other dairy flavors, as well as organic acids to provide sour flavors and the like. The intent has been particularly to provide a butter taste sensation using hard and brittle flakes, and although cheese is mentioned among the many flavoring constituents that may be used, the resulting baked product is merely reported to have identifiable localized areas of the colored and/or flavored flake in spots throughout the baked product that have a discernable taste. It is recognized that there may be some discernable cheese flavor, but it is also noted that the FEHR et al patent describes only localized areas of concentrated flavor, which is not necessarily a true or real flavor and which might be specifically of a more gummy texture and/or caramelized flavor. Moreover, FEHR et al provide a product which is essentially fat, with very little solid constituent present.

Several other references which are directed to cheese fillings for bakery products or savory flavored baking chips include CLICKNER U.S. Pat. No. 2,015,257, and PLAYER et al U.S. Pat. No. 4,643,907 issued Feb. 17, 1987. However, neither of those references contemplate a cheese-based substantially anhydrous product having from about 20% to about 50% of cheese solids with the balance being cheese-compatible oils that are substantially liquid at about 35° C. to about 40° C. and which exhibit solid fat index curve characteristics similar to those of butterfat.

Specifically, CLICKNER requires 37% of "plastic butter", whereas the minimum amount of cheese-compatible oils that may be used in the present invention is about 48%. Moreover, CLICKNER requires 25% of re-dried corn starch, whereas the present invention requires that the only solid constituent shall be cheese solids that are present in the amount of from about 20% to about 50%.

PLAYER et al will permit no greater than about 35% of fat constituent in terms of a defined hard butter—a blend of hydrogenated soya bean and cotton seed oil. PLAYER et al also requires the use of a flavoring material that might be cheese, but might also be meat, vegetable, fish, or a combination thereof. The remainder is still further hard butter that has a defined particle size whose purpose is to present a non-gritty texture. Still further, PLAYER et al require that the base of their savory flavored baking chips must be free from any amount of discoloring ingredients that might be subject to browning or deterioration, specifically dairy-derived solids such as cheese solids—which are a principal constituent of the cheese-based anhydrous products of the present invention.

A similar product which is cheese-containing confectionary-like coating is provided by WILSON U.S. Pat. No. 4,567,047. There, the cheese-flavored confectionary composition includes dry powdered cheese but also a bland particulate fill, hard butter, and an emulsifier and starine. The teachings, and the restrictions, are not unlike PLAYER et al; specifically, WILSON is particularly concerned with providing a dry hard butter so as to preclude moisture pick-up by the product once it has been manufactured.

Yet another prior art approach to the provision of a nut-cheese product is taught by HOOVER U.S. Pat. No. 4,198,493 issued Apr. 15, 1980. However, what HOOVER teaches is a product that has 50% to 80% by weight of ground roasted nuts with 10% to 40% of dehydrated cheese material and 5% to 15% of a texture modifying agent which has very low activity. In contradistinction to HOOVER, the present invention requires from about 48% to about 80% of the cheese-based component and cheese-compatible oils which also must be compatible with butterfat and exhibit substantially identical solid fat index curve characteristics as those of butterfat. Thus, oils such as coconut oil, and gylcerides, as suggested by HOOVER, are clearly not acceptable.

A further reference is VAN HULLE et al U.S. Pat. No. 4,251,551 issued Feb. 17, 1981. That patent discloses food compositions where cheese-coated puffed snack products that may be prepared for eating by the consumer in a microwave oven are found. Once again, the products require the use of edible fatty triglycerides with from 10% to 60% by weight of cheese solids. Coconut oils, salt and monosodium glutamate are also included, and coconut oils will not exhibit similar solid fat index characteristics to that of butterfat.

Finally, European patent No. 0121253 published Oct. 10, 1984, ROSA et al (Nabisco Brands Inc.) teaches a cheese-flavored composition which has a chocolate-like texture and which may be used for confectionary units and coatings. Here, the cheese particles are coated with fat, contrary to the present invention which requires an homogenous mixture of liquid oils or fats which must satisfy the solid fat index curve characteristics of butterfat, and within which the dry cheese solids are held in suspension at elevated temperatures of 35° C. to 40° C. when the cheese-compatible oils and fats are substantially liquid.

OBJECTS OF THE INVENTION

It is a purpose of the present invention to provide cheese-based dry flake products which are intended tier incorporation into baked goods and flour confections. Such cheese-based dry flake products as are provided by the present invention may have varying specific formulations, depending on their intended use in a baked product or other flour confection. However, the cheese-based dry flake products of the present invention have a significant cheese solids content.

The present invention therefore provides cheese-based dry flake products that may have defined ranges of solid fat and liquid fat components at defined temperatures, so as to be capable of being incorporated into baked goods and other flour confections and so that the baked goods or flour confections may be appropriately labelled as having a cheese ingredient.

In keeping with the above, the present invention provides processes for the preparation of cheese-based dry flake products intended for incorporation into baked goods and flour confections.

Likewise, in keeping with the above, the present invention also provides process steps whereby the prepared cheese-based dry flake products may have specific and controlled physical characteristics including the size of the individual discrete flakes being produced.

Still further, the present invention provides an apparatus for the preparation of the cheese-based dry flake product where such product having defined characteristics and formulations may consistently be made with high degrees of automation.

Another purpose of the present invention to provide a cheese-based snack bar which is not greasy or fatty to the touch, which may be easily handled, which may be easily wrapped and unwrapped or otherwise packaged and removed from the package, and which will exhibit exceptional shelf-life. By being a molded cheese-based snack bar, the snack bar may have any particular shape as may be desirable, although the usual processes for molding the cheese-based snack bar will usually result in snack bars that at least have a substantially constant thickness. The manufacturer's name or other inscription, designs, or logos, may be molded or pressed into the snack bar, as well.

In yet another aspect of the present invention, a convenient snack item is provided which comprises two distinct or discrete components; a cheese-based component and a cracker or biscuit component. The cheese-based component is prepared in keeping with certain aspects of the teachings of this invention as described hereafter, and is dry or anhydrous cheese-based edible product that is not fatty to the touch, will retain its shape, will not degrade by rotting or being mouldy, and which is intimately associated with the biscuit or cracker component in such a manner that the two may be consumed as a single snack item in one or several mouthfuls.

BRIEF DESCRIPTION OF THE DRAWINGS

Various aspects of the present invention will be described in greater detail hereafter, in association with the accompanying drawings, in which.

DETAILED DESCRIPTION OF THE PREFERRED EMBODIMENTS

Figure 1:
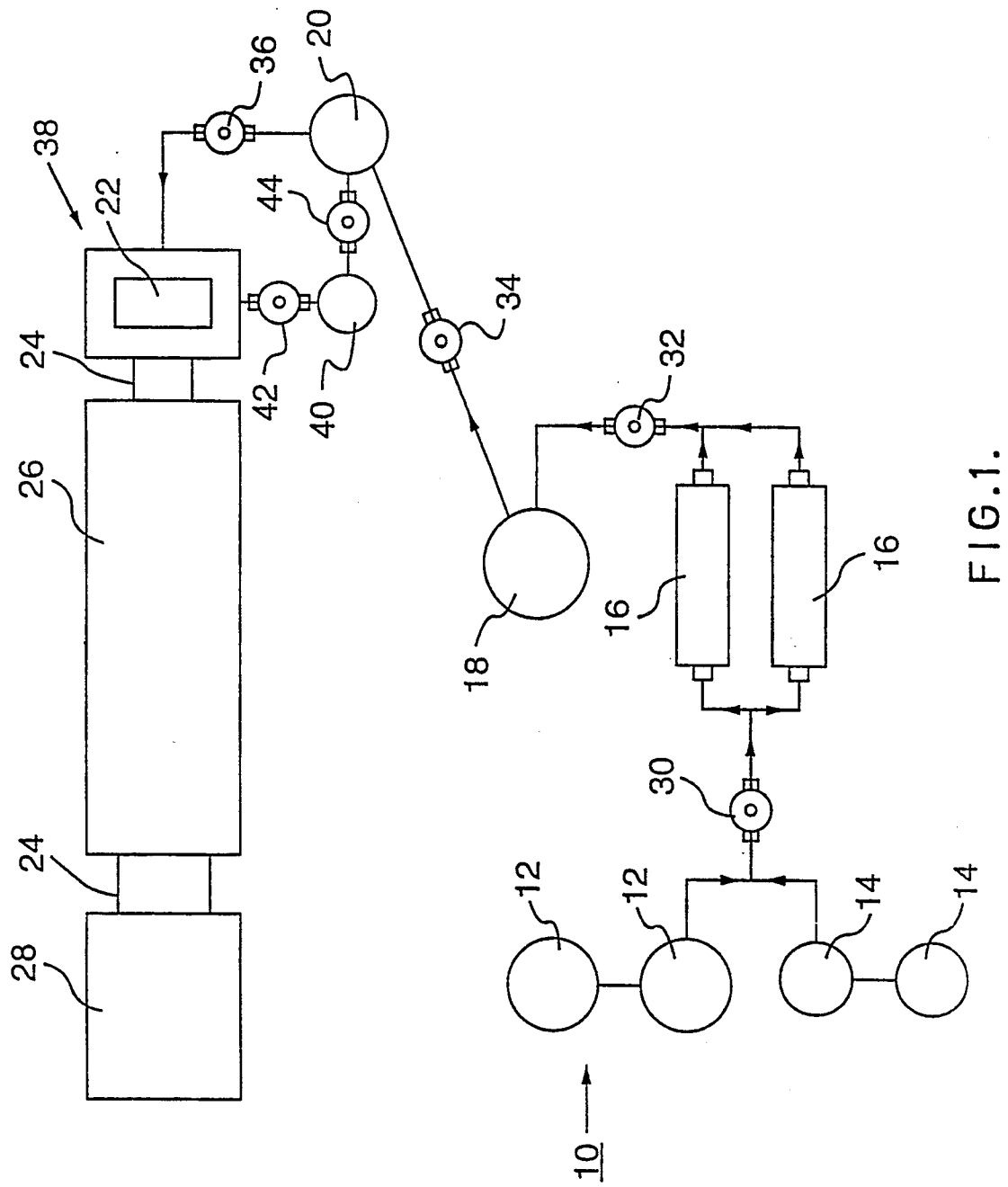
FIG. 1 is a schematic floor plan of a manufacturing facility in which cheese-based dry flake products of the present invention may be made.

In keeping with the present invention, the dry cheese-based flake, or the cheese-based component of the snack items is anhydrous, in that it has from substantially 0% to 2% by weight of moisture, and also comprises from about 20% to about 50% by weight of cheese solid, with the balance being a cheese-compatible oil or liquid fat that is substantially liquid when at elevated temperatures of about 35° C. to about 40° C. When used in the formulation of dry cheese-based flake products of the present invention, the oil or liquid fat must also be bakery-compatible. The cheese solids are naturally occurring cheese solids which are derived from cheeses from which substantially all water has been removed, and thus the cheese solids comprise the remaining butterfat, protein and lactose constituents of the cheeses from which they have been manufactured.

The cheese-compatible oil may be a suitable vegetable oil, liquid butter fat or other liquid dairy fat, and mixtures thereof when liquid during the manufacturing stage. The cheese-compatible oil will exhibit generally similar solid fat index and melting points as those of butterfat. Moreover, the cheese-compatible oil has a eutectic capacity so as to be miscible with the butterfat constituent of the cheese solids, in any proportion, as discussed hereafter. Butterfat is, of course, the fat or oil constituent of naturally occurring milk.

Finally, the cheese-compatible and bakery-compatible oils that are used in keeping with the present invention must have a eutectic capacity with respect to butterfat. That means that the cheese-compatible and bakery-compatible oils must be miscible—capable of being mixed and enter into an homogenous mixture—with butterfat, in any proportion of the cheese-compatible and bakery-compatible oils being used and the butterfat, at elevated temperatures of about 40° C.

The ratio of the oils or fats used in products according to the present invention together with butterfat will depend to a greater or lesser extent on the intended baked product into which the cheese-based dry flake product is to be incorporated.

Of course, depending on the intended use, in dry flakes for bakery purposes or as the cheese-based component of snack items, and as well depending on the bulk or brick cheese product from which the cheese solids have been derived, the balance constituent of the cheese-based component according to the present invention may optionally further comprise additional ingredients. Those ingredients may be, for example, flavoring ingredients such as spices, herbs, cheese-compatible enzymes, salt, and other cheese-compatible natural flavors. Still further, the balance constituent of the cheese-based dry flake products may comprise small amounts of additional coloring ingredients such as annatto colors or other cheese-compatible natural coloring agents.

As noted above, the characteristic curves which describe the solid fat index and melting points of the cheese-compatible oils, and bakery-compatible oils as necessary, and of butterfat, should be substantially similar to each other. Moreover, the cheese-compatible and bakery-compatible oils should exhibit the characteristic that they are sufficiently stable at about room temperature (20° C. ±) so that the oils will not smear during mixing with other prescribed ingredients of the baked goods and flour confections being made, prior to those baked goods and flour confections being baked. In other words, the cheese-compatible and bakery-compatible oils will not become part of the shortening being used in the bakery product, and thereby upset the formulation or recipe for the bakery product.

Also, as to fulfil eating enjoyment of the snack items of the present invention, it is general to ensure, and—if necessary, adjust—the ratios of solid and liquid fat components to be used in the formulation of the cheese-based portion of the snack item in order that there will be a pleasant mouth sensation with a full sense of cheese flavor. In order for that to occur, it is usual that the cheese-compatible oils shall have a melting point of about 35° C. to about 40° C. so that they may begin to melt if not fully melt in the mouth when the snack item is consumed. When cooled and consumed as a firm or substantially solidified product, the cheese-based component of the snack item of the present invention is regarded as being anhydrous—having a moisture content of only substantially 0%—and it therefore has a "dry" mouth sensation. If the cheese-based portion of the snack item does not show any propensity to melt in the mouth, then its consumption may be unpleasant—or at least, not as enjoyable as it might be—since there will be a mouth sensation of consuming a dry paste-like or waxy cheese without any significant flavor.

Still further, the formulation of the cheese-based dry flake product of the present invention should provide that the cheese-compatible and bakery-compatible oils have the characteristic of sufficiently slow flow rates so that they stay relatively firm during a baking process for the bakery product or flour confection being baked.

Typically, the baking process may take place at temperatures from about 170° C. up to about 200° C., and the baking process may extend for periods of from about 5 minutes up to about 45 minutes.

When bakery products such as cheese bread are being manufactured, the dough from which the bread is baked is usually proofed prior to baking. Thus, the cheese-compatible and bakery-compatible oils should also be such that they have sufficiently slow flow rates so that they stay relatively firm during a bakery proofing process which may take place at temperatures of from about 40° C. up to about 60° C., and for periods ranging from a few minutes up to about a two hours. On the other hand, the cheese-compatible and bakery-compatible oils will generally have a melting point of about 35° C. to about 40° C., so that they will melt in the mouth when the baked goods or flour confections are eaten.

Typically, cheese-based dry flake products according to the present invention will have a physical thickness when they are first produced of from about 1.0 mm to about 3.0 mm. The flakes are generally rectangular or square when first produced, and will have a length along each of their sides of from about 1.0 cm to about 3.0 cm. The cheese-based dry flake products will, when they are first introduced into the bakery mix, or even when they are delivered from being manufactured, exhibit the characteristic of being a dry flake which is relatively brittle. Although the dry flakes may fracture during handling, they may for the most part have the dimensions discussed above. However, when the dry flake is, in fact, mixed into the bakery recipe, the individual pieces may break into smaller pieces but they still retain their physical integrity for when the bakery product is being eaten.

In general, for the cheese-compatible oil to have a eutectic capacity so as to be miscible at elevated temperatures with the butterfat constituent of the cheese solids, in any proportion, and to give the mouth sense described above, the characteristic curves which describe the solid fat index and melting points of the cheese-compatible oil and the butterfat constituent of the cheese should be substantially similar to each other. Specifically, the following table addresses the solid fat index curve ranges for vegetable oils; it being recognized that vegetable oils which exhibit the solid fat index curve with defined ranges of solid fat and liquid fat components at the defined temperatures are miscible at elevated temperatures with butterfat in any proportion, and will solidify or crystallize at lower temperatures as an homogeneous mixture. Thus, as noted above, the so-called "eutectic capacity" of such vegetable oils and of butterfat permit their miscibility in any proportion, the mixture also exhibits the solid fat index curve characteristics as defined in the following table.

Solid Fat Index Curve Characteristics for Cheese-Compatible Vegetable Oils 10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats.

It may be that, in order to achieve the solid fat index curve characteristics set forth in the table, above, it will be necessary to process the solid fats of the vegetable oils being used by blending them, or fractionating, or hydrogenating, but only to the extent necessary so as to obtain the solid fat index curve having the defined ranges of solid fat and liquid components at the defined temperatures.

In general, the cheese-compatible and bakery-compatible oils should be free of mono-diglycerides or other additives apart from flavors, spices, or natural coloring, as discussed above. The cheese-compatible and bakery-compatible oils are chosen from the group consisting of vegetable oils whose characteristics are otherwise as discussed above, butter oils —i.e.: liquid butterfats—, and mixtures of those vegetable oils and butter oils.

Turning now to the process by which the dry flake product as described above is manufactured, in its broadest sense the process comprises the following steps:

(a) Mixing the cheese solids and the cheese-compatible and bakery-compatible oil so as to obtain a substantially homogenous mixture. The mixing is carried out at a temperatures of 40° C.±1.5° C.

(b) The homogenous mixture is then transferred to a holding tank. The temperature of the homogenous mixture is maintained at about 40.5° C. to about 42° C. while it is in the holding tank.

(c) While the homogenous mixture is in the holding tank, it is continuously agitated.

(d) The homogenous mixture is pumped from the holding tank to a tempering unit, on demand as described hereafter. While the homogenous mixture is in the tempering unit it is also continuously agitated, but it is slightly cooled to a temperature of about 33° C.±1° C.

(e) Then, the slightly cooled homogenous mixture is transferred and deposited in a substantially thin and substantially even layer on a moving belt.

(f) The moving belt is then passed through a cooling tunnel at such a speed that any single portion of the homogenous mixture deposited on the belt remains in the cooling tunnel for from about 3 minutes to about 6 minutes. While it is in the cooling tunnel, the homogenous mixture is cooled to a temperatures of from about 6° C. to about 12° C.

(g) As the cooled homogenous mixture exits the cooling tunnel but while it is still on the moving belt, the cooled mixture is broken into discrete dry cooled flakes.

(h) Finally, the discrete dry cooled flakes are removed from the moving belt for further handling and/or storage and/or shipping.

It follows, from all of the above, that the oils and/or liquid fats being used are substantially in a liquid phase above about 35° C. to 40° C., and are miscible as liquids, and they are substantially solidified at least at about 6° C. to about 12° C. Moreover, once solidified, they will relatively firm and will show no tendency to smear at about room temperature (20° C. ±).

Referring to FIG. 1, the apparatus is identified by the reference numeral 10, and comprises the following generally defined elements or principal components:

There may be a series of storage tanks such as tanks 12 and 14 in which the substantially dried cheese solids, the cheese-compatible and bakery-compatible oils, flavoring ingredients and coloring ingredients may be stored. The precise nature of those storage tanks is not material to the present discussion, but it should be stated that in general those storage tanks and all associated piping and other components are made from suitable materials such as stainless steel in which food ingredients can be safely stored and handled under sanitary conditions. In general, the cheese-compatible and bakery-compatible oils, and perhaps even the other dry ingredients such as the cheese solids, and the coloring and flavoring additives, may be maintained in the storage tanks 12 and 14 at temperatures of about 42° C. to about 45° C. prior to being used.

In any event, appropriate amounts of the various ingredients are pumped or transferred using transfer pump 30 to at least one thermostatically controlled mixer 16. Each thermostatically controlled mixer 16 is a high torque closed mixer. Step (a) is carried out in the mixers 16 at 40° C.±1.5° C. until a substantially homogenous mixture of the ingredients is achieved. The viscosity and the ingredient content of the homogenous mixture that is achieved in the high torque mixer 16 will be dictated by the intended end use of the cheese-based dry flake product being manufactured, as discussed above.

Then, using the first process pump 32, the resulting mixture is pumped to at least one holding tank 18, as shown. As noted with respect to step (b), the homogenous mixture is maintained in the holding tank at a temperature of about 40.5° C. to about 42° C.; and in keeping with step (c), the homogenous mixture is continuously agitated while it remains in the holding tank 18. By continuously agitating the homogenous mixture in the holding tank 18, the cheese solids are maintained in suspension in the cheese-compatible and bakery compatible oils, and thereby the homogeneity of the mixture is maintained.

Then, as required and on demand, the mixed and homogenous liquid having the cheese solids and other ingredients in suspension in the oils is pumped using the second process pump 34 to a tempering unit 20, in keeping with step (d). The tempering unit 20 is a heat exchanger, and while the homogenous mixture is in the tempering unit 20 it is also continuously agitated while being slightly cooled to a temperature of about 33° C.±1° C. By cooling the homogenous mixture, the crystallization process for the liquid homogenous mixture is initiated, with the crystallization being carried out ultimately within the cooling tunnel as described hereafter. Because the dry flake product is a crystallized product, it is important that the crystallization process be initiated under controlled conditions, and that will occur in the tempering unit. As the crystallization begins, and as the homogenous product beings to cool, it also becomes more viscous.

By the time the slightly cooled mixture, at about 33° C.±1° C. leaves the tempering unit 20, approximately 5% to about 8% of the oil constituent has crystallized.

The slightly cooled homogenous mixture is then transferred to a moving belt 24, using a third process pump 36. In keeping with step (e), the slightly cooled homogenous mixture is deposited on the moving belt in a substantially thin and substantially even layer. That is accomplished by pumping the mixture onto the surface of the belt 24 just behind an adjustable levelling means 22, which is supported on table 78. The levelling means 22 is described in greater detail hereafter, but it is noted that the initial product is placed on the upper surface of the belt 24 at 62; and after passing beneath the levelling means 22 it forms a substantially thin and substantially even layer 64.

Then, as described in step (f) above, the moving belt 24 and the substantially thin and substantially even layer 64 is passed through a cooling tunnel 26. The speed of the moving belt may be adjusted so that any portion of the mixture in layer 64 remains in the cooling tunnel 26 for from about 3 minutes to about 6 minutes, and is cooled to a temperature of from about 6° C. to about 12° C. when it exits the cooling tunnel at the product handling station 28. The by then cooled and dried layer 64 then passes through a breaking station 54 where the layer 64 is broken in discrete dry cooled flakes, in keeping with step (g).

Finally, the discrete dry cooled flakes are removed in keeping with step (h) from the belt 24 for further handling and/or storage and/or shipping. Typically, the flakes are removed from the belt 24 using a scraper 60 having delivery chute 66 associated with it.

However, it will be noted in FIG. 1 that there is also associated with the delivery station 38 at the delivery end of the belt 24 other associated equipment. Specifically, there is provided a surge tank 40, with which is associated a fourth process pump 42 and a fifth process pump 44. Bat happens is that any excess mixture deposited at 62 on the belt 24 that is not retained on the belt as it passes beneath the levelling means 22 is returned by the pump 42 through a conduit 68 to the surge tank 40. The surge tank 40 is maintained at about 38° C. to about 42° C. (usually 40.5° C. to 42° C.) so as to kill or re-liquify any crystallized fat that returns to it from the entry station 38. Then, after it has been re-heated in the surge tank 40, a fifth process pump 44 will return the re-heated mixture from the surge tank 40 back to the tempering unit 20.

While the quantity of the product that is deposited on the belt 24 at 62 is demand controlled, means are provided including a bypass valve structure 70 and the conduit 68 to return excess homogenous mixed product to the surge tank 40. What remains passes beneath the adjustable levelling means 22, which includes a heated bar spreader. The thickness of the layer 64 can be adjusted by adjusting means 72 on the levelling means 22, so as to move it up or down away from or closer to the surface of the belt 24. Thus, if there is too much mixed liquid product being delivered at 62 for the required depth or thickness of the layer 64 being deposited on the belt, then the bypass valve structure 70 will open and the excess mixed liquid product is returned to the surge tank 40.

From the above, it will be seen that any mixed liquid product that is not deposited on the belt for transfer through the cooling tunnel is continuously being circulated from the entry station 38 through the surge tank 40 to the tempering unit 20.

Obviously, the process step (a) of mixing the cheese solids and the cheese-compatible and bakery-compatible oil may also comprise optionally mixing additional flavoring ingredients or additional coloring ingredients. As noted above, the additional flavoring ingredients may be chosen from the group consisting of spices, herbs, cheese-compatible enzymes, salt, or other cheese-compatible natural flavors; and the additional coloring ingredients may be chosen from the group consisting of annatto colors and other cheese-compatible natural coloring agents.

So as to ensure that the layer of product 64 when it is dried and cooled after passing through the cooling tunnel 26 will break into small discrete dry flakes, the deposited layer 64 is preferably scored by passing the deposited mixture in a direction parallel to the direction of motion of the belt 24 beneath scoring pins or blades 76. This gives rise to the following further process step:

(i) after step (e), scoring the deposited mixture on the belt in a direction parallel to the direction of motion of the belt by passing said deposited mixture on the belt beneath one or a plurality of scoring pins or blades.

Figure 3:
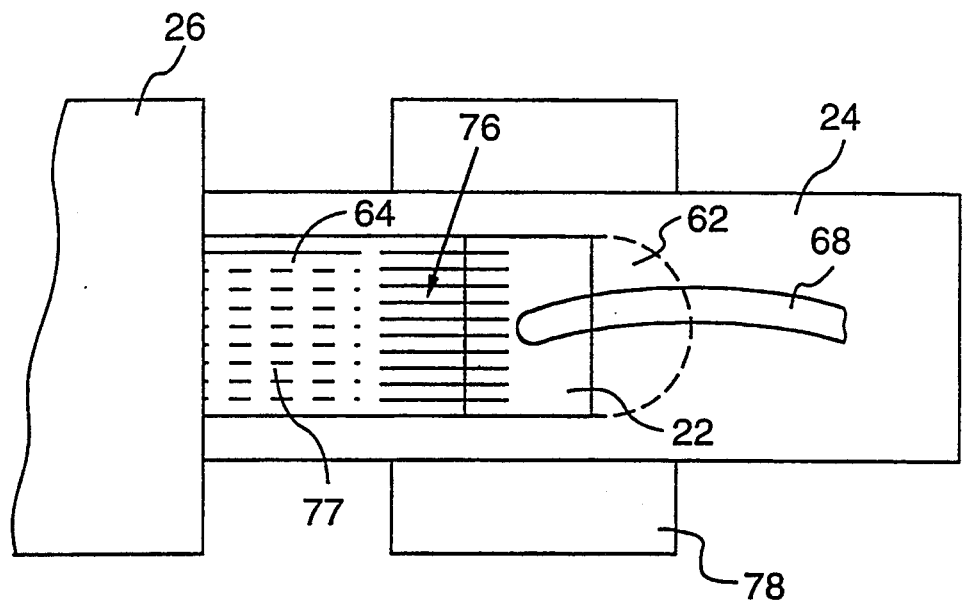
FIG. 3 is an idealized plan view of the apparatus of FIG. 2.
Figure 4:
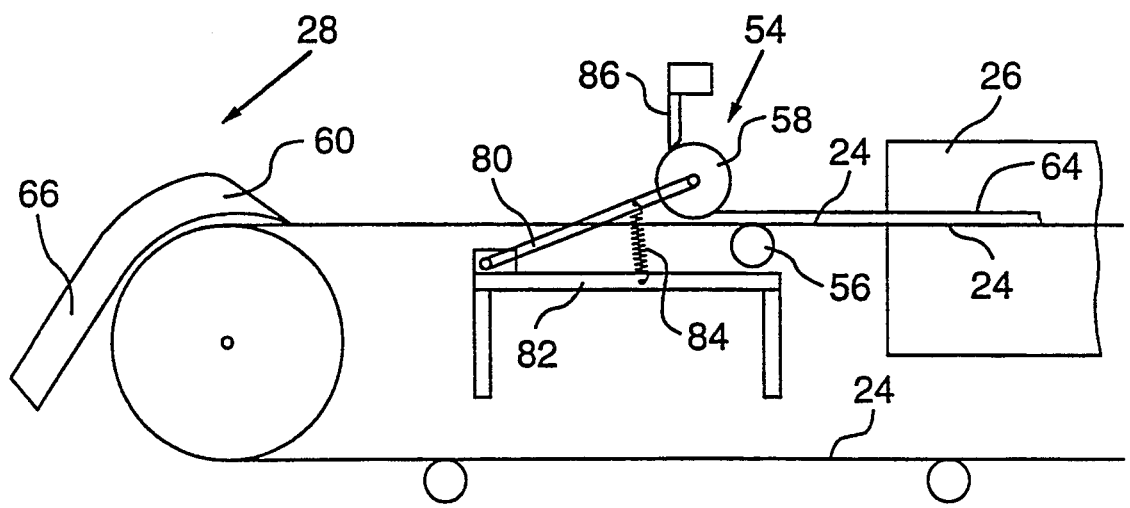
FIG. 4 is an idealized elevation of the exit end of a cooling tunnel used in manufacturing cheese-based dry flake products in keeping with the present invention.

It will be seen from FIG. 3 that a plurality of score lines 77 can be formed in the layer 64, and thereby the dry flake product having discrete width portions will be formed. This is because the mixture of cheese solids, cheese compatible and bakery compatible oils and other additional ingredients is sufficiently viscous when it is scored to at least partially retain the scored impressions that are made in it.

Process step (g) is carried out by passing the flexible belt 24 and the scored deposited mixture layer 64 on it into the breaker station 54. At that station, the belt and the mixture are passed over a fixed roller 56 and under a breaker roller 58. Because the belt is flexible, the weight of the breaker roller presses down onto the scored deposited layer 64, and the scored mixture fractures along fracture lines which are transverse to the direction of motion of the belt 24. Thus, there are formed discrete dry cooled flakes defined at their edges by the score lines 77, and transverse to the belt 24 by the fracture lines formed beneath the breaker roller 58.

The breaker roller 58 may be adjustable as to its distance away from the fixed roller 56, and as to the pressure that it exerts downwardly. The adjustment as to its lengthwise adjustment along the belt 24 may be arranged by adjusting the end of arm 80 relative to the mounting table 82; and the pressure exerted by the breaker roller 58 may be adjusted by adjusting a tension spring 84—which may also be an adjustable weight. So as to ensure that the breaker roller 58 is kept clean, a scraper 86 may be associated with it.

In general, so as to assure a controlled fracture of the layer 64 as it passes beneath the breaker roller 58, the diameter of the breaker roller 58 is larger than that of the fixed roller 56.

The scraper 60 and associated chute 66 are arranged to scrape the discrete dry cooled flakes that are then formed on the belt 24 as they pass beneath the breaker roller 58 off the surface of the belt, from which they may pass down the chute 66 into suitable waiting containers for additional handling and/or storage and/or shipping.

Tightening means 46 may be provided, for example on the roller 47 around which the belt 24 wraps at the entrance end of the cooling tunnel 26. The tightening means 46 provides enough adjustment that the belt 24 will be maintained substantially taut and level as it passes through the cooling tunnel 26. Likewise, a speed adjustment 50 may be provided so as to control the speed of the flexible moving belt 24 so that any portion of the belt and the mixture deposited on the belt will remain in the cooling tunnel 26 for from about 3 minutes to about 6 minutes. Still further, temperature adjustment means 52 will be provided to control the temperature of the cooling tunnel 26 so that the mixture that is on the belt 24 will exit the cooling tunnel at a temperature of from about 6° C. to about 12° C.

As noted above, the dimensions of the dry cheese-based flakes as they are formed after passing beneath the breaker roller 58 will be such that their thickness is typically 1.0 mm to about 3.0 mm. The distance between the scoring blades 76 may be adjustable from typically about 1.0 cm up to about 3.0 cm. Likewise, the adjustment of the breaker roller 58 with respect to the fixed roller 56 will result in fracture lines transversely across the dried layer 64 at distances of from about 1.0 cm up to about 3.0 cm.

It has been found that, typically, commercial bakers will require that the cheese-based dry product will have dimensions of approximately 1.5 mm thick and be about 1.5 cm square. However, it is recognized that the dry cheese-based flake product flakes will possibly break up into smaller flakes during storage and shipping or handling, or even by further processing in the bakery. This is quite acceptable, because the cheese-based flakes will otherwise retain their flavor and their physical integrity until the baked product is consumed. In that regard, it will be noted that the dry cheese-based flake product flakes are typically relatively frangible when they are cool, but that are somewhat flexible when heated above room temperature, as will occur during the baking process.

Figure 5:
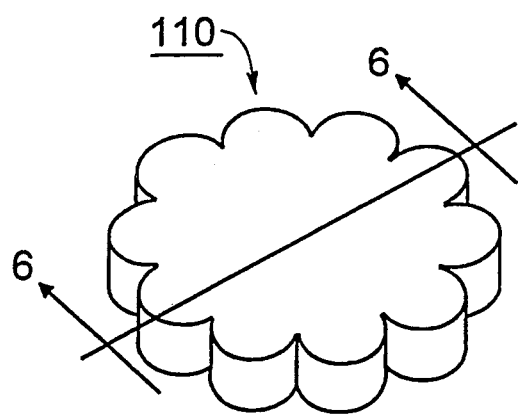
FIG. 5 is an idealized perspective view of a typical molded cheese-based snack item according to the present invention.
Figure 6:
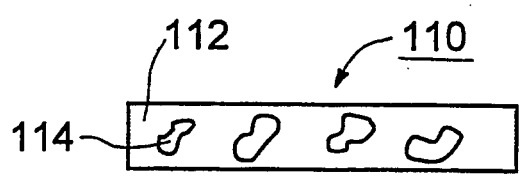
FIG. 6 is a view taken along the lines 6—6 of FIG. 5.

Turning now to FIGS. 5 through 10, a molded snack bar 110 is shown generally in FIGS. 5 and 6. Here, the molded snack bar has a particular fluted configuration; however, the configuration of the snack bar may be of any desired shape such as square or rectangular, round, and so on. Because the snack bar is molded, it generally has a substantially constant thickness. However, as noted above, the manufacturer's name or other designs or logos may be molded into the molded snack bar.

While the particulate edible and cheese-compatible additive that is admixed to the cheese-based product may be visible—or at least portions of it may be visible—at the outer periphery or surfaces of the molded snack bar, FIG. 6 in particular shows that the particulate and edible cheese-compatible additive may be clearly distinguished in a cross-section such as that taken along lines 6—6 of FIG. 5. There, the additive 113—which may be crisp puffed rice—is quite distinguishable within the solidified and molded cheese-based component which is shown generally at 112.

Figure 8:
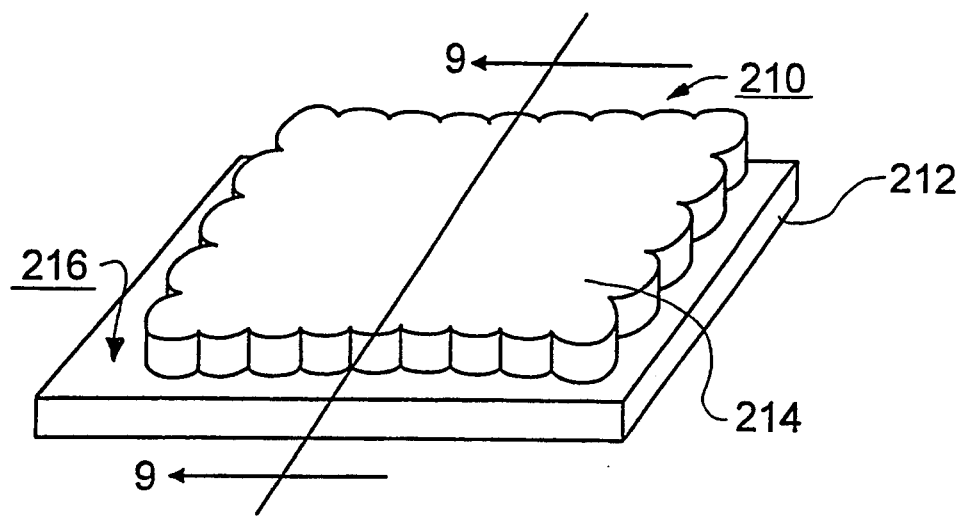
FIG. 8 is an idealized perspective view of a typical molded cheese-based and cracker or biscuit snack item according to the present invention.
Figure 9:
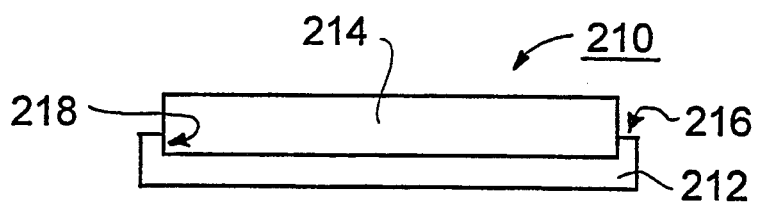
FIG. 9 is a view taken along the lines 9—9 of FIG. 8.

With references to FIGS. 8 and 9, there is shown a typical snack item 210 which has a first discrete layer 212 and a second discrete layer 214. The first discrete layer 212 is a dry molded cheese-based disc or medallion; the second layer 214 is a pre-baked biscuit or cracker.

The preparation of the cheese-based component of the snack items, and the characteristics thereof, are as discussed above. Thus, as noted, the cheese-based component 112 or 212 of a snack item of the present invention comprises from substantially 0% to 2% by weight of moisture, from about 20% to about 50% by weight of cheese solids, with the balance being a cheese-compatible oil or liquid fat. The cheese-compatible oil may be chosen from the group consisting of suitable vegetable oils, liquid butter fats and other liquid dairy fats, and mixtures thereof; and the cheese-compatible oil exhibits generally similar solid fat index and melting points as those of butterfat. Moreover, the cheese-compatible oil or liquid fat has a eutectic capacity so as to be miscible with the butterfat constituent of cheese solids, in any proportion, at elevated temperatures of about 40° C.

In its broadest sense, the preparation of the cheese-based component of the snack item comprises the following steps:

(a) As before, mixing the cheese solids and the cheese-compatible oils so as to obtain a substantially homogenous mixture. The mixing step is carried out at a temperatures of 40° C.±1.5° C.

(j) A predetermined amount of the particulate cheese-compatible edible additive is admixed to the substantially homogenous mixture in an amount so that the proportion of the additive reaches a predetermined level.

(k) Then, the homogenous mixture and the particulate additive that has been admixed thereto are pumped to a tempering unit, and are continuously agitated while in the tempering unit. The homogenous mixture and particulate additive are slightly cooled, but the homogenous mixture is maintained at least in a partially liquid state.

(l) Thereafter, a predetermined portion of the homogenous mixture and additive are transferred to a mold, for further processing.

(m) The homogenous mixture and additive that have been placed in the mold are then cooled until the cheese-compatible oil constituent of the homogenous mixture has solidified.

(n) Finally, the cooled homogenous mixture and additive are unmolded as a molded cheese-based snack bar, and removed away for further handling and/or storage and/or shipping.

As for the preparation of the cheese-based component of the snack item 210, the following steps are followed:

(a) As before, mixing the cheese solids and the cheese-compatible oils so as to obtain a substantially homogenous mixture. The mixing step is carried out at temperatures of 40° C.±1.5° C.

(o) Pumping the homogenous mixture to a tempering unit, and continuously agitating the homogenous mixture while it is in the tempering unit. At the same time, the homogenous mixture is slightly cooled but must be maintained at least in a partially liquid state. In other words, the cooled homogenous mixture that will leave the tempering unit must still be relatively liquid and not have a very high viscosity.

(p) Then, a predetermined portion of the at least partially liquid homogenous mixture is transferred to a mold, in which the molded disc or medallion will be prepared.

(q) The predetermined portion of the homogenous mixture that has been placed in the mold is continued to be cooled while it is in the mold.

(r) Before the homogenous mixture has cooled to the extent that the cheese-compatible oil constituent has not yet fully solidified, and therefore so that while the homogenous mixture is at least still slightly liquid, a pre-baked flour-based biscuit or cracker is placed into the mold and onto the surface of the homogenous cheese-based mixture.

(s) Then, the combination of the homogenous mixture and the biscuit or cracker is continued to be cooled until the cheese-compatible oil constituent has solidified.

(t) Finally, the cooled homogenous mixture and the biscuit or cracker combination is unmolded for further handling and/or storage and/or shipping.

Generally, step (o), as it is described above, comprises cooling the homogenous mixture to a temperature of from about 25° C. to about 30° C.

In general, step (j) is carried out so that the predetermined amount of the particulate cheese-compatible edible additive that is admixed to the homogenous mixture is provided in such an amount that the proportion of the additive in the molded snack bar being manufactured will be in the range of from about 10% to about 60% of the volume of the molded cheese-based snack bar.

It follows, from all of the above, that the oils and/or liquid fats being used are substantially in a liquid phase above about 35° C. to 40° C. and are miscible as liquids, and they are substantially solidified at least at about 6° C. to about 12° C. Moreover, once solidified, they will remain relatively firm at about room temperature (20° C. ±).

Figure 7:
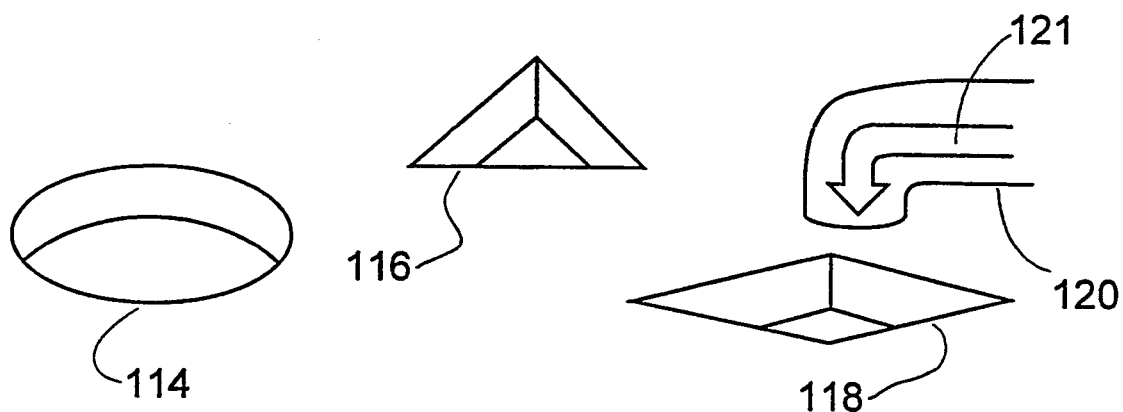
FIG. 7 is an idealized representation of various manners or shapes, and the process of manufacture of a molded cheese-based snack item of the present invention.

The purpose of FIG. 7 is particularly to demonstrate that the molded snack bar of the present invention may be molded in a variety of shapes. Thus, for example, mold cavities 114, 116, and 118, are shown and they are respectively circular, triangular, and rectangular in shape when viewed from above. Each is filled, or at least partially filled, such as front a dispensing nozzle 120 which will dispense a predetermined portion of the homogeneous mixture and additive, as shown by arrow 121. The molded mixture is then sent on for further handling.

Figure 10:
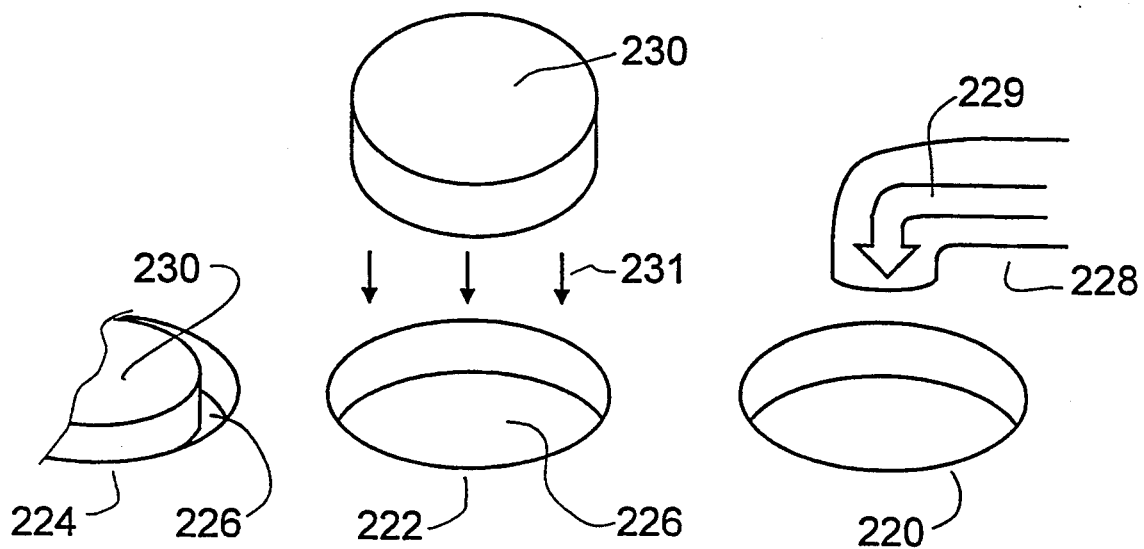
FIG. 10 is an idealized representation of the progressive steps followed during the manufacture of a molded cheese-based layer and cracker or biscuit snack item of the present invention.

Now, having regard to FIGS. 9 and 10, it will be noted that the biscuit or cracker 214 has a smaller projected area than that of the dry molded cheese-based disc or medallion 212. Therefore, a border area designated generally at 216, which is the top surface of the cheese-based medallion 212, surrounds the periphery of the biscuit or cracker 214.

Also, as seen in FIG. 10, the dry molded cheese-based medallion or disc 212 overlies at least a portion of the peripheral edges of the biscuit or cracker 214. This is shown at the portion 218 of the edge of the biscuit or cracker 214 which extends below the surface 216. Thus, the biscuit or cracker 214 extends into the cheese-based disc or medallion 212, at least to some extent.

It is not necessary that the biscuit or cracker 214 extend into the cheese-based disc or medallion 212 to any significant extent, provided that there is sufficient gripping or interstitial surface action between the cracker or biscuit and the cheese-based product when it is still slightly liquid that the cracker or biscuit 214 is securely bonded to the cheese-based disc or medallion 212.

So as to effect the secure bonding of the biscuit or cracker 214 to the cheese-based disc or medallion 212, step (r) above may further comprise applying a light pressure against the biscuit or cracker 214 so as to slightly embed the biscuit or cracker 214 into the at least slightly liquid homogenous mixture of the cheese-based disc or medallion 212, before it is fully solidified or set.

Turning now to FIG. 10, several steps in the process of manufacture of snack items 210 according to the present invention are demonstrated. In this case, it is contemplated that the snack item will generally have a round configuration when viewed from above.

Three consecutive mold cavities 220, 222, and 224, are shown, Mold cavity 220 is, as yet, untilled, whereas mold cavity 222 already has placed in it a predetermined portion or charge 226 of the homogenous mixture which will cool to form the cheese-based disc or medallion 212 of the respective snack item. That predetermined portion or charge 226 is placed into the mold cavity such as by being dispensed from a dispensing nozzle 228, as shown at arrow 229.

A biscuit or cracker 230 is to be placed onto or slightly into the surface of the charge 226 in mold cavity 222, by being placed downwardly thereinto as shown at arrows 231. Then, as shown with respect to mold cavity 224, the charge of cheese-based homogenous mixture 226 and the cracker or biscuit 230 are then subjected to further handling.

Figure 2:
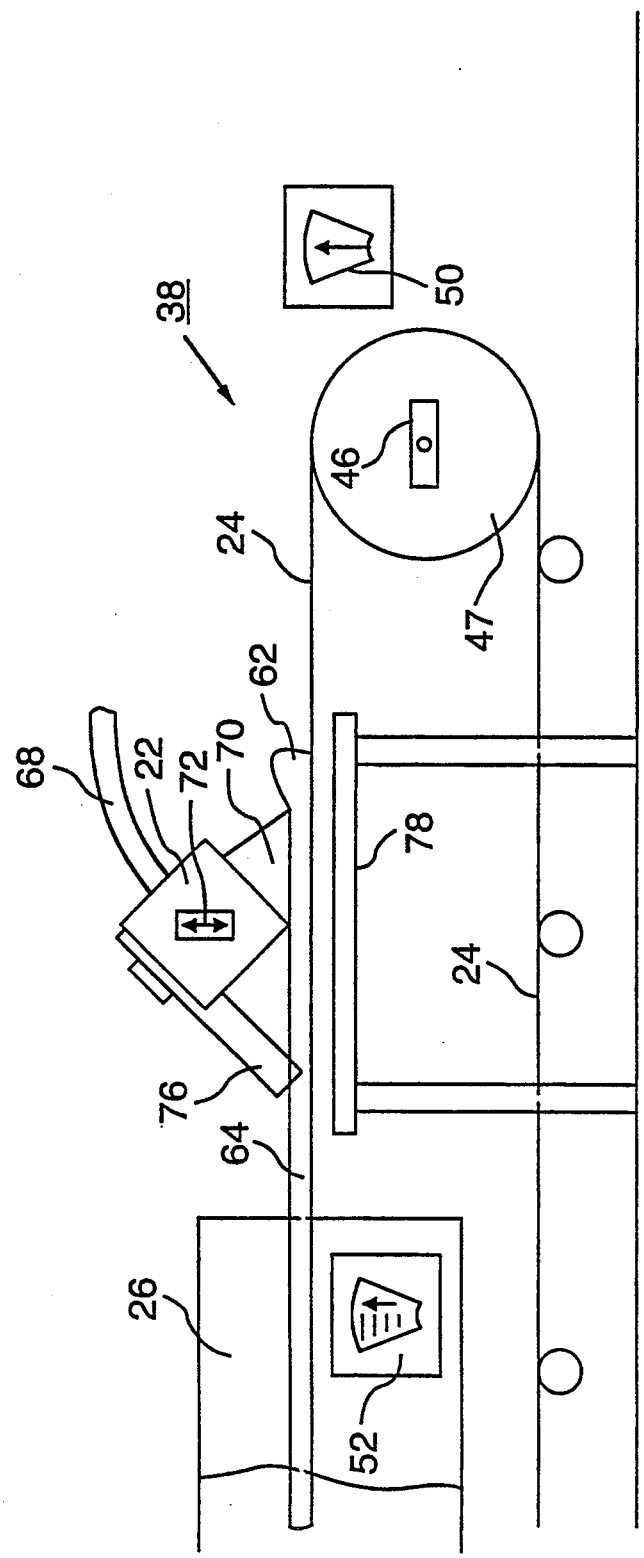
FIG. 2 is an idealized elevation view of the front end of a cooling tunnel and the associated equipment used in manufacturing cheese-based dry flake products, in keeping with the present invention.

That further handling will, at this stage, comprise cooling the combination of the cheese-based homogenous mixture and the biscuit or cracker so as to substantially fully solidify the cheese-based component by solidifying its oils and butterfat constituents. This comprises carrying out step (m) or step (s) as noted above, by cooling the then formed snack item to a temperature of from about 6° C. to about 12° C. This latter step is expeditiously achieved by passing the molds through a cooling tunnel, such as cooling tunnel 26 of FIGS. 1 or 2. This will effect a slight contraction of the cheese-based portion of the snack item 110 or 210, of perhaps, 1% or 2%, so that it may be more easily removed or released from the mold.

Thereafter, the cooled snack items have been formed and, in each case, the cheese-based molded snack bar 110, or the cheese-based disc or medallion 212 of snack item 210, has become a dry molded product. The manufacturer's name may conveniently be molded into the cheese-based snack or medallion, as may any design or logo. Because of the manufacturing processes described above, there is achieved a dry cheese-based product having cheese suspended in a fat system which is easy to handle and which does not have a fatty or greasy texture or feel. The unmolded snack items that are thereby processed may be conveniently wrapped or packaged, and will exhibit exceptional or extended shelf-life without the necessity for special storage except to maintain them in a dry environment—generally at normal room temperatures of 16° C. to about 22° C.

Generally, when the molded cheese-based snack bar is demolded or removed from the mold cavity, it may be individually wrapped and then packaged together with other molded cheese-based snack bars in a package. Individual molded cheese-based snack bars according to the present invention may be individually wrapped for point-of-purchase display purposes. Likewise, the molded cheese-based and cracker or biscuit snack item may be individually wrapped, or packaged with other similar items, for retain display and sale.

There has been described dry cheese-based flake products which may be incorporated into baked goods and other flour confections. Those products are derived from cheese solids together with cheese-compatible and bakery-compatible oils, and other optional ingredients. Processes for manufacturing the dry flake cheese-based products have been described, and also the apparatus on which the products may be manufactured has been described. The product that is obtained has excellent cheese flavoring without a gummy texture or lactose burning when it is incorporated into a baked product.

There has also been provided a snack item which may be conveniently carried in the pocket or a lunch box, briefcase, etc., which may be readily unwrapped and consumed without creating any mess, and which gives a pleasant mouth sensation and flavor of cheese together with its edible additive. The snack item is healthy and convenient, and will not readily degrade so as to result in a health or allergy hazard. Thus, there has been described a convenient snack item, and processes for its manufacture.

The scope of the invention is defined by the appended claims.

What is claimed is:

1. An edible cheese-based fat system which may be molded or spread onto a belt for manufacture into flake products;
   wherein said edible cheese-based fat system is intended for incorporation into baked goods and flour confections or for use in snack items and comprises from substantially zero to 2% by weight of moisture, from about 20% to about 50% by weight of cheese-solids, with the balance of said edible cheese-based fat system being a cheese-compatible and bakery-compatible oil that is substantially liquid at about 35° C. to about 40° C., and which exhibits a solid fat index curve characteristic having defined ranges of solid fat and liquid fat components at defined temperatures, as follows:
   10.0° C.—43–66% solid fats, balance liquid fats
   21.1° C.—32–52% solid fats, balance liquid fats
   26.6° C.—20–44% solid fats, balance liquid fats
   33.3° C.—6–25% solid fats, balance liquid fats
   40.0° C.—0–5% solid fats, balance liquid fats;
   wherein said cheese solids are naturally occurring cheese solids derived from cheeses from which substantially all water has been removed, and said cheese solids comprise the remaining butterfat, protein, and lactose constituents of said cheeses;
   wherein said cheese-compatible and bakery-compatible oil is selected from the group consisting of suitable vegetable oils, liquid butterfats, and other liquid dairy fats, and mixtures thereof, and exhibits the said solid fat index curve characteristics and similar melting points as those of butterfat;
   wherein said cheese-compatible and bakery-compatible oil is miscible with the butterfat constituent of said cheese-solids, in any proportion at temperatures of about 35° C. to about 40° C., so as to make a substantially homogenous mixture therewith, in which said protein and lactose constituents are held in suspension; and
   wherein said cheese-based fat system is such that when said homogenous mixture solidifies at about 6° C. to about 12° C., said cheese-based fat system will remain substantially solidified at room temperature of about 20° C. ±, up to temperatures below about 35° C.

2. A cheese-based dry flake product for incorporation into baked goods and flour confections, wherein said dry flake product comprises from substantially 0 to 2% moisture, from about 20% to about 50% cheese solids, with the balance being a cheese-compatible and bakery-compatible oil that is substantially liquid at about 35° C. to about 40° C., and which exhibits a solid fat index curve characteristic having defined ranges of solid fat and liquid fat components at defined temperatures, as follows:
   10.0° C.—43–66% solid fats, balance liquid fats
   21.1° C.—32–52% solid fats, balance liquid fats
   26.6° C.—20–44% solid fats, balance liquid fats
   33.3° C.—6–25% solid fats, balance liquid fats
   40.0° C.—0–5% solid fats, balance liquid fats;
   wherein said cheese solids are naturally occurring cheese solids derived from cheeses from which substantially all water has been removed, and said cheese solids comprise the remaining butterfat, protein and lactose constituents of said cheeses;
   wherein said cheese-compatible and bakery-compatible oil is selected from the group consisting of suitable vegetable oils and liquid butter fats, and mixtures thereof, which exhibit the said solid fat index curve characteristic;

wherein said cheese-compatible and bakery-compatible oil further exhibits similar melting points as those of butterfat;

wherein said cheese-compatible and bakery-compatible oil is miscible with liquid butterfat constituent of said cheese solids, in any proportion, at temperatures of about 35° C. to about 40° C., so as to make a substantially homogeneous mixture therewith, in which said protein and lactose constituents are held in suspension; and wherein said homogeneous mixture solidifies at about 6° C. to about 12° C. and remains substantially solidified at temperatures below about 35° C.

3. The cheese-based dry flake product of claim 2, wherein said balance constituent of said product may optionally further comprise additional flavoring ingredients selected from the group consisting of spices, herbs, cheese-compatible enzymes, salt, and other cheese-compatible natural flavors.

4. The cheese-based dry flake product of claim 3, wherein said balance constituent of said product may optionally further comprise additional coloring ingredients selected from the group consisting of annatto colors and other cheese-compatible natural coloring agents.

5. The cheese-based dry flake product of claim 2, wherein said cheese-compatible and bakery-compatible oil is selected from the group consisting of suitable vegetable oils and liquid butter fats, and mixtures thereof.

6. The cheese-based dry flake product of claim 2, wherein said cheese-compatible and bakery-compatible oils exhibit the characteristic that they are stable at about room temperature so as not to smear during mixing with the other prescribed ingredients of said baked goods and flour confections into which said cheese-based dry flake product is being incorporated, prior to said baked goods and flour confections being baked.

7. The cheese-based dry flake product of claim 2, wherein said cheese-compatible and bakery-compatible oils exhibit the characteristic that they have slow flow rates so as to stay substantially firm during a baking process at temperatures of from about 170° C. up to about 200° C., for periods of from about 5 minutes up to about 45 minutes.

8. The cheese-based dry flake product of claim 2, wherein said cheese-compatible and bakery-compatible oils exhibit the characteristic that they have slow flow rates so as to stay substantially firm during a bakery proofing process at temperatures of from about 40° C. up to about 60° C., for periods of from a few minutes up to about a few hours.

9. The cheese-based dry flake product of claim 2, wherein, when necessary, solid fat constituents of said vegetable oils are processed by being blended or fractionated or hydrogenated only to the extent necessary so as to obtain the said solid fat index curve characteristic having said defined ranges of solid fat and liquid fat components at said defined temperatures.

10. A molded cheese-based snack bar comprising a dry molded cheese-based product having a particulate cheese-compatible edible additive admixed therewith;

wherein said molded cheese-based product comprises from substantially 0% to 2% by weight of moisture and from about 20% to about 50% by weight of cheese solids, with the balance being a cheese-compatible oil that is substantially liquid at about 35° C. to about 40° C., and which exhibits a solid fat index curve characteristic having defined ranges of solid fat and liquid fat components at defined temperatures, as follows:

10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

wherein said cheese solids are naturally occurring cheese solids derived from cheeses from which substantially all water has been removed, and said cheese solids comprise the remaining butterfat, protein and lactose constituents of said cheeses;

wherein said cheese-compatible oil is selected from the group consisting of suitable vegetable oils, liquid butter fats and other liquid dairy fats, and mixtures thereof, and exhibits the said solid fat index curve characteristic, and similar melting points as those of butterfat;

wherein said cheese-compatible oil is miscible with the butterfat constituent of said cheese solids, in any proportion at temperatures of about 35° C. to about 40° C., so as to make a substantially homogeneous mixture therewith, in which said protein and lactose constituents are held in suspension;

wherein said homogeneous mixture solidifies at about 6° C. to about 12° C. and remains firm at room temperature of about 20° C. ±;

wherein said particulate cheese-compatible edible additive is selected from the group consisting of crisp puffed rice or crisp puffed wheat, other prepared breakfast cereals and the like, popcorn, peanuts, croutons, bacon bits and the like; and wherein the proportion of said particulate cheese-compatible edible additive is in the range of from about 10% to about 60% of the volume of said molded cheese-based snack bar.

11. The cheese-based snack bar of claim 10, wherein said balance constituent of said product may optionally further comprise additional flavoring ingredients selected from the group consisting of spices, herbs, cheese-compatible enzymes, salt, and other cheese-compatible natural flavors.

12. The cheese-based snack bar of claim 10, wherein said balance constituent of said product may optionally further comprise additional coloring ingredients selected from the group consisting of annatto colors and other cheese-compatible natural coloring agents.

13. The cheese-based snack bar of claim 10, where said cheese-compatible and bakery-compatible oils have a melting point of about 35° C. to about 40° C. so as to melt in the mouth when cheese-based snack bar item is eaten.

14. The cheese-based snack bar of claim 10, wherein said cheese-compatible oil is a liquid dairy fat.

15. The cheese-based snack bar of claim 10, wherein said bar is molded so as to have a substantially constant thickness.

16. A snack item comprising a first discrete layer and a second discrete layer, wherein said first layer is a dry molded cheese-based disc and said second layer is a baked flour-based biscuit or cracker;

wherein said first cheese-based discrete layer comprises from substantially 0% to 2% by weight of moisture and from about 20% to about 50% by weight of cheese solids, with the balance being a cheese-compatible oil that is substantially liquid at about 35° C. to about 40° C., and which exhibits a solid fat index curve characteristic having defined ranges of solid fat and liquid fat components at defined temperatures, as follows:
10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;
wherein said cheese solids are naturally occurring cheese solids derived from cheeses from which substantially all water has been removed, and said cheese solids comprise the remaining butterfat, protein and lactose constituents of said cheeses;
wherein said cheese-compatible oil is selected from the group consisting of suitable vegetable oils, liquid butter fats and other liquid dairy fats, and mixtures thereof, and exhibits the said solid fat index curve characteristic, and similar melting points as those of butterfat;
wherein said cheese-compatible oil is miscible with the butterfat constituent of said cheese solids, in any proportion at temperatures of about 35° C. to about 40° C., so as to make a substantially homogeneous mixture therewith, in which said protein and lactose constituents are held in suspension;
wherein said homogeneous mixture solidifies at about 6° C. to about 12° C. and remains firm at room temperature of about 20° C. ±; and
wherein said baked flour-based biscuit or cracker has been pre-baked.

17. The snack item of claim 16, wherein said balance constituent of said cheese-based discrete layer may optionally further comprises additional flavoring ingredients selected from the group consisting of spices, herbs, cheese-compatible enzymes, salt, and other cheese-compatible natural flavors.

18. The snack item of claim 16, wherein said balance constituent of said cheese-based discrete layer may optionally further comprise additional coloring ingredients selected from the group consisting of annatto colors and other cheese-compatible natural coloring agents.

19. The snack item of claim 16, wherein said cheese-compatible and bakery-compatible oils have a melting point of about 35° C. to about 40° C. so as to melt in the mouth when said snack item is eaten.

20. The snack item of claim 16, wherein said cheese-compatible oil is a dairy fat.

21. The snack item of claim 16, wherein said biscuit or cracker has a smaller projected area than that of said dry molded cheese-based disc.

22. The snack item of claim 21, wherein said dry molded cheese-based disc overlies at least a portion of the peripheral edges of said biscuit or cracker.

23. A process for the preparation of an edible cheese-based fat system which may be molded in a mold or spread onto a belt for manufacture into flake products;
wherein said edible cheese-based fat system is intended for incorporation into baked goods and flour confections or for use in snack items and comprises from substantially zero to 2% by weight of moisture, from about 20% to about 50% by weight of cheese-solids, with the balance of said edible cheese-based fat system being a cheese-compatible and bakery-compatible oil that is substantially liquid at about 35° C. to about 40° C., and which exhibits a solid fat index curve characteristic having defined ranges of solid fat and liquid fat components at defined temperatures, as follows:
10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;
wherein said cheese solids are naturally occurring cheese solids derived from cheeses from which substantially all water has been removed, and said cheese solids comprise the remaining butterfat, protein, and lactose constituents of said cheeses;
wherein said cheese-compatible and bakery-compatible oil is selected from the group consisting of suitable vegetable oils, liquid butterfats, and other liquid dairy fats, and mixtures thereof, and exhibits the said solid fat index curve characteristics and similar melting points as those of butterfat;
wherein said cheese-compatible and bakery-compatible oil is miscible with the butterfat constituent of said cheese-solids, in any proportion at temperatures of about 35° C. to about 40° C., so as to make a substantially homogenous mixture therewith, in which said protein and lactose constituents are held in suspension; and
wherein said cheese-based fat system is such that when said homogenous mixture solidifies at about 6° C. to about 12° C., said cheese-based fat system will remain substantially solidified at room temperature of about 20° C. ±, up to temperatures below about 35° C.;
said process comprising the steps of:
(a) mixing said cheese-solids and said cheese-compatible and bakery-compatible oil in a mixer so as to obtain a substantially homogenous mixture, said mixing step being carried out a temperature of 40° C.±1.5° C.;
(u) pumping said homogenous mixture to a tempering unit, continuously agitating said homogenous mixture while in said tempering unit, and slightly cooling said homogenous mixture while maintaining the homogenous mixture in a partially liquid state; transferring said slightly cooled homogenous mixture to a mold for manufacture of molded products or spreading said slightly cooled homogenous mixture onto a belt for manufacture into flake products;
(v) cooling said homogenous mixture until said cheese-compatible oil constituent has solidified; and
(w) removing or unmolding said cooled homogenous mixture for further handling and/or storage and/or shipping.

24. A process for the preparation of cheese-based dry flake product for incorporation into baked goods and flour confections, wherein said dry flake product comprises from substantially 0 to 2% moisture, from about 20% to about 50% cheese solids, with the balance being a cheese-compatible and bakery-compatible oil that is substantially liquid at about 35° C. to about 40° C., and which exhibits a solid fat index curve characteristic having defined ranges of solid fat and liquid fat components at defined temperatures, as follows:
10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats 40.0° C.—0–5% solid fats, balance liquid fats;

wherein said cheese solids are naturally occurring cheese solids derived from cheeses from which substantially all water has been removed, and said cheese solids comprise the remaining butterfat, protein and lactose constituents of said cheeses;

wherein said cheese-compatible and bakery-compatible oil is selected from the group consisting of suitable vegetable oils and liquid butter fats, and mixtures thereof, which exhibit the said solid fat index curve characteristic;

wherein said cheese-compatible and bakery-compatible oil further exhibits similar melting points as those of butterfat;

wherein said cheese-compatible and bakery-compatible oil is miscible with liquid butterfat constituent of said cheese solids, in any proportion, at temperatures of about 35° C. to about 40° C., so as to make a substantially homogeneous mixture therewith, in which said protein and lactose constituents are held in suspension; and wherein said homogeneous mixture solidifies at about 6° C. to about 12° C. and remains substantially solidified at temperatures below about 35° C.;

said process comprising the steps of:
  (a) mixing said cheese solids and said cheese-compatible and bakery-compatible oil in a mixer so as to obtain a substantially homogenous mixture, said mixing step being carried out at a temperature of 40° C.±1.5° C.;
  (b) transferring said homogenous mixture to a holding tank, and maintaining the temperature of said homogenous mixture at about 40.5° C. to about 42° C.;
  (c) continuously agitating said homogenous mixture while it is in said holding tank;
  (d) pumping said homogenous mixture to a tempering unit, continually agitating said homogenous mixture while in said tempering unit, and slightly cooling said homogenous mixture to about 33° C.±1° C.;
  (e) transferring said slightly cooled homogenous mixture and depositing the same in a substantially thin substantially even layer on a moving belt;
  (f) passing said moving belt through a cooling tunnel so that any portion of said mixture remains in said cooling tunnel for from about three minutes to about six minutes, and is cooled to a temperature of from about 6° C. to about 12° C.;
  (g) breaking said cooled mixture into discrete dry cooled flakes as it exits said cooling tunnel on said belt; and
  (h) removing said discrete dry cooled flakes from said belt for further handling and/or storage and/or shipping.

25. The process of claim 24, wherein steps (d) and (e) are carried out continuously, and any excess mixture not deposited in step (e) is returned to a surge tank from said tempering unit and is heated to about 40° C.±2° C. to re-liquify any crystallized fat in said excess mixture, and then said re-heated mixture is returned to said tempering unit.

26. The process of claim 25, wherein step (a) may further optionally comprise adding additional flavoring ingredients to said mixture, where said flavoring ingredients are selected from the group consisting of spices, herbs, cheese-compatible enzymes, salt, and other cheese-compatible natural flavors.

27. The process of claim 26, wherein step (a) may further optionally comprise adding additional coloring ingredients to said mixture, where said coloring ingredients are selected from the group consisting of annatto colors and other cheese-compatible natural coloring agents.

28. The process of claim 27, further comprising the step of:
  (i) after step (e), scoring said deposited mixture on said belt in a direction parallel to the direction of motion of said belt by passing said deposited mixture on said belt beneath one or a plurality of scoring pins or blades.

29. The process of claim 28, wherein step (g) is carried out by passing said belt and said scored, deposited mixture thereon over a fixed roller and under a breaker roller, wherein said breaker roller presses down onto said scored, deposited mixture and said belt is sufficiently flexible that said scored, deposit mixture fractures along fracture lines transverse to the direction of motion of said belt so as to form said discrete dry cooled flakes.

30. The process of claim 29, wherein step (h) is carried out at least in part by scraping said discrete dry cooled flakes off said moving belt.

31. The process of claim 29, wherein the thickness of said deposited mixture on said belt is from about 1.0 mm to about 3.0 mm, the distance between each of a plurality of scoring pins or blades is from about 1.0 cm to about 3.0 cm, and said breaker roller is positioned with respect to said fixed roller so that the distance between consecutive fracture lines is about 1.0 cm to about 3.0 cm.

32. A process for the manufacture of molded cheese-based snack bars which comprise a dry molded cheese-based product having a particulate cheese-compatible edible additive mixed therewith;

wherein said molded cheese-based product comprises from substantially 0% to 2% by weight of moisture and from about 20% to about 50% by weight of cheese solids, with the balance being a cheese-compatible oil that is substantially liquid at about 35° C. to about 40° C., and which exhibits a solid fat index curve characteristic having defined ranges of solid fat and liquid fat components at defined temperatures, as follows:

10.0° C.—43–66% solid fats, balance liquid fats
  21.1° C.—32–52% solid fats, balance liquid fats
  26.6° C.—20–44% solid fats, balance liquid fats
  33.3° C.—6–25% solid fats, balance liquid fats
  40.0° C.—0–5% solid fats, balance liquid fats;

wherein said cheese solids are naturally occurring cheese solids derived from cheeses from which substantially all water has been removed, and said cheese solids comprise the remaining butterfat, protein and lactose constituents of said cheeses;

wherein said cheese-compatible oil is selected from the group consisting of suitable vegetable oils, liquid butter fats and other liquid dairy fats, and mixtures thereof, and exhibits the said solid fat index curve characteristic, and similar melting points as those of butterfat;

wherein said cheese-compatible oil is miscible with the butterfat constituent of said cheese solids, in any proportion at temperatures of about 35° C. to about 40° C., so as to make a substantially homogeneous mixture therewith, in which said protein and lactose constituents are held in suspension;

wherein said homogeneous mixture solidifies at about 6° C. to about 12° C. and remains firm at room temperature of about 20° C. ±;

wherein said particulate cheese-compatible edible additive is selected from the group consisting of crisp puffed rice or crisp puffed wheat, other prepared breakfast cereals and the like, popcorn, peanuts, croutons, bacon bits and the like; and wherein the proportion of said particulate cheese-compatible edible additive is in the range of from about 10% to about 60% of the volume of said molded cheese-based snack bar;

said process comprising the steps of:
(a) mixing said cheese solids and said cheese-compatible oil so as to obtain a substantially homogenous mixture, said mixing step being carried out at a temperature of 40° ±1.5° C.;
(j) admixing a specific amount of said particulate cheese-compatible edible additive so that the proportion of said additive reaches a predetermined level;
(k) pumping said homogenous mixture and additive to a tempering unit, continuously agitating said homogenous mixture and additive while in said tempering unit, and slightly cooling said homogenous mixture and additive while maintaining the homogenous mixture in a partially liquid state;
(l) transferring a predetermined portion of said homogenous mixture and additive to a mold;
(m) cooling said homogenous mixture and additive until said cheese-compatible oil constituent has solidified; and
(n) unmolding the cooled homogenous mixture and additive for a further handling and/or storage and/or shipping.

33. The process of claim 32, wherein step (k) comprises cooling said homogenous mixture and additive to a temperature of from about 25° C. to about 30° C.

34. The process of claim 32, wherein step (m) is carried out by cooling said homogenous mixture and additive to a temperature of from about 6° C. to about 12° C.

35. The process of claim 32, wherein step (m) is carried out by passing said homogenous mixture and additive through a cooling tunnel.

36. The process of claim 32, wherein step (a) may further optionally comprise adding additional flavoring ingredients to said mixture, where said flavoring ingredients are selected from the group consisting of spices, herbs, cheese-compatible enzymes, salt, and other cheese-compatible natural flavors.

37. The process of claim 32, wherein step (a) may further optionally comprise adding a small amount of additional coloring ingredients to said mixture, where said coloring ingredients are selected from the group consisting of annatto colors and other cheese-compatible natural coloring agents.

38. The process of claim 32, wherein step (m) is carried out by cooling the combination of said homogenous mixture and said biscuit or cracker through a cooling tunnel.

39. A process for the manufacture of snack items which have first and second discrete layers, wherein the first layer of each snack item is a dry molded cheese-based disc and the second layer of each snack item is a baked flour-based biscuit or cracker;

wherein said first cheese-based discrete layer comprises from substantially 0% to 2% by weight of moisture and from about 20% to about 50% by weight of cheese solids, with the balance being a cheese-compatible oil that is substantially liquid at about 35° C. to about 40° C., and which exhibits a solid fat index curve characteristic having defined ranges of solid fat and liquid fat components at defined temperatures, as follows:
10.0° C.—43-66% solid fats, balance liquid fats
21.1° C.—32-52% solid fats, balance liquid fats
26.6° C.—20-44% solid fats, balance liquid fats
33.3° C.—6-25% solid fats, balance liquid fats
40.0° C.—0-5% solid fats, balance liquid fats;

wherein said cheese solids are naturally occurring cheese solids derived from cheeses from which substantially all water has been removed, and said cheese solids comprise the remaining butterfat, protein and lactose constituents of said cheeses;

wherein said cheese-compatible oil is selected from the group consisting of suitable vegetable oils, liquid butter fats and other liquid dairy fats, and mixtures thereof, and exhibits the said solid fat index curve characteristic, and similar melting points as those of butterfat;

wherein said cheese-compatible oil is miscible with the butterfat constituent of said cheese solids, in any proportion at temperatures of about 35° C. to about 40° C., so as to make a substantially homogeneous mixture therewith, in which said protein and lactose constituents are held in suspension;

wherein said homogeneous mixture solidifies at about 6° C. to about 12° C. and remains firm at room temperature of about 20° C. ±; and wherein said baked flour-based biscuit or cracker has been re-baked;

said process comprising the steps of:
(a) mixing said cheese solids and said cheese-compatible oil so as to obtain a substantially homogenous mixture, said mixing step being carried out at a temperature of 40° C.±1.5° C.;
(o) pumping said homogenous mixture to a tempering unit, continuously agitating said homogenous mixture while in said tempering unit, and slightly cooling said homogenous mixture while maintaining the homogenous mixture at least in a partially liquid state;
(p) transferring a predetermined portion of said at least partially liquid homogenous mixture to a mold;
(q) continuing to cool said homogenous mixture while in said mold;
(r) placing a pre-baked flour-based biscuit or cracker into said mold and onto the surface of said homogenous mixture within said mold while said homogenous mixture is at least slightly liquid and the cheese-compatible oil constituent has not yet fully solidified;
(s) cooling the combination of said homogenous mixture and said biscuit or cracker until said cheese-compatible oil constituent has solidified; and
(t) unmolding the cooled homogenous mixture and biscuit or cracker combination for further handling and/or storage and/or shipping.

40. The process of claim 39, wherein step (o) comprises cooling said homogenous mixture to a temperature of from about 25° C. to about 30° C.

41. The process of claim 39, wherein step (r) further comprises applying a slight pressure against said biscuit or cracker so as to slightly embed said biscuit or cracker into said at least slightly liquid homogenous mixture.

42. The process of claim 39, wherein step (s) is carried out by cooling the combination of said homogenous mixture and said biscuit or cracker to a temperature of from about 6° C. to about 12° C.

43. The process of claim 42, wherein step (s) is carried out by passing the combination of said homogenous mixture and a biscuit or cracker through a cooling tunnel.

44. The process of claim 39, wherein step (a) may further optionally comprise adding additional flavoring ingredients to said mixture, where said flavoring ingredients are selected from the group consisting of spices, herbs, cheese-compatible enzymes, salt, and other cheese-compatible natural flavors.

45. The process of claim 39, wherein step (a) may further optionally comprise adding additional coloring ingredients to said mixture, where said coloring ingredients are selected from the group consisting of annatto color and other cheese-compatible natural coloring agents.

46. The process of claim 39, wherein step (s) is carried out by cooling the combination of said homogenous mixture and said biscuit or cracker through a cooling tunnel.

* * * * *